US009956921B2

(12) United States Patent
Arvidsson et al.

(10) Patent No.: US 9,956,921 B2
(45) Date of Patent: May 1, 2018

(54) WHEEL HOLDER FOR A BICYCLE CARRIER

(71) Applicant: Thule Sweden AB, Hillerstorp (SE)

(72) Inventors: Andreas Arvidsson, Sävsjö (SE); Olof Lindholm, Värnamo (SE); Morgan Lindell, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days. days.

(21) Appl. No.: 15/315,288

(22) PCT Filed: Apr. 22, 2015

(86) PCT No.: PCT/EP2015/058634
§ 371 (c)(1),
(2) Date: Nov. 30, 2016

(87) PCT Pub. No.: WO2015/185260
PCT Pub. Date: Dec. 10, 2015

(65) Prior Publication Data
US 2017/0197557 A1 Jul. 13, 2017

(30) Foreign Application Priority Data
Jun. 5, 2014 (EP) .................................... 14171267

(51) Int. Cl.
*B60R 9/10* (2006.01)
*B62H 3/08* (2006.01)

(52) U.S. Cl.
CPC ................ *B60R 9/10* (2013.01); *B62H 3/08* (2013.01)

(58) Field of Classification Search
CPC .. B60R 9/10; B60R 9/06; B60R 9/048; B60R 2011/0071; B62H 3/08; Y10S 224/924
See application file for complete search history.

(56) References Cited

U.S. PATENT DOCUMENTS 4,875,608 A * 10/1989 Graber ...................... B60R 9/06
224/493
2007/0164065 A1 7/2007 Davis
2011/0297712 A1 12/2011 Shen

FOREIGN PATENT DOCUMENTS

DE 199 34 384 1/2001
DE 10 2005058861 6/2007
(Continued)

OTHER PUBLICATIONS

International Search Report and Written Opinion of the International Searching Authority for International Appl. No. PCT/EP2015/058634, European Patent Office, Berlin, Germany, dated Jun. 19, 2015, 10 pages.

*Primary Examiner* — Corey Skurdal
(74) *Attorney, Agent, or Firm* — Sterne, Kessler, Goldstein & Fox P.L.L.C.

(57) ABSTRACT

A wheel holder for a bicycle carrier for a vehicle includes at least one body having at least one wheel receiving surface, a first plane aligned with a rotation plane of the bicycle wheel after the bicycle wheel has been mounted to the wheel holder, and at least one fastening member configured to retain the bicycle wheel to the at least one wheel receiving surface of the body. The fastening member has a released position in which the bicycle wheel can be positioned in the wheel holder and a secured position in which the wheel holder retains the bicycle wheel. The at least one fastening member is configured to extend in a diagonal direction across the first plane when positioned in the secured position.

15 Claims, 6 Drawing Sheets

(56) References Cited

FOREIGN PATENT DOCUMENTS

EP          2 562 048        2/2013
WO     WO 03/006277      1/2003

* cited by examiner

WHEEL HOLDER FOR A BICYCLE CARRIER

TECHNICAL FIELD

The present invention relates to a wheel holder for a bicycle carrier and a bicycle carrier having at least one wheel holder. The wheel holder is configured to provide a rigid and stable connection with the wheel.

BACKGROUND

Bicycle carriers, sometimes referred to as bicycle racks, are used to transport bicycles on vehicles. When transporting bicycles on vehicles manufacturers have constantly struggled with the problem of readily attaching the bicycle to the bicycle carrier to prevent accidents. The US patent application no. US 2007/0164065 A1 disclose a bicycle holder for a bicycle rack. The bicycle holder comprises two engagement members adapted to engage in two tracks. The engagement members embrace the bicycle rack and are said to be configured to be slideably engaged with the tracks. A securing portion in the form of a strap is used to secure the wheel of the to the bicycle holder.

The German patent application DE 10 2005 058 861 A1, Volkswagen AG, disclose a bicycle wheel holder comprising a plate and a lever. The wheel is pinched between the plate and the lever. It has now been found that wheel holders for bicycle carriers can be improved.

The wheel holder describes above suffers from the drawbacks. None of the above mentioned publications provides for a wheel holder which imparts stability to the wheel while being retained to the wheel holder. The wheels may be destabilized by air turbulence for example as the vehicle moves, such air turbulence may cause wheel to wobble for example. If a wheel wobbles, there will be a disturbing sound and vibrations in the vehicle. In the long run it may also increase the risk for fatigue breakdown of the material in the wheel holder or in other parts of the bicycle carrier. An attempt to address this problem has been to have wheel holder having cradles which support the wheel sides. These attempts have not been very successful.

SUMMARY

It is an object of the present disclosure to provide for an improved wheel holder for a bicycle carrier which removes or at least reduces the drawbacks described above. The objects are at least partly met by a wheel holder for a bicycle carrier for a vehicle. The wheel holder is configured to receive and retain a wheel having a tread and comprises at least one body providing a first and a second wheel receiving surface. The first and the second wheel receiving surfaces are separated a distance in a first plane, the first plane is aligned with a rotation plane of the wheel of the bicycle after the wheel has been mounted to the wheel holder. At least one fastening member is adapted to retain the wheel of the bicycle to the first and the second wheel receiving surfaces of the body.

A void is formed between the first and second wheel receiving surfaces, the void is adapted to receive a portion of the wheel of the bicycle so that the first and second wheel receiving surfaces provide two distinct support points to the tread of the wheel separated by the void when the fastening member retains the wheel of the bicycle to the body of the wheel holder.

The wheel holder provides for a compact wheel holder which also provides for stability to the wheel. A compact wheel holder has the benefits of providing low wind resistance especially when a bicycle is not mounted thereto. The wheel holder has two distinct support points for supporting the outer wheel circumference, i.e. the tread of the wheel. The first and the second wheel receiving surfaces provide the wheel with first and a second distinct support points which are separated at least with respect to the length of the wheel holder.

The distinct support points can be separate support points. In such as case, the void can be a support point free zone. In some cases however, the tread of the wheel may rest gently on the underlying surface. In such cases, the main support to the wheel is imparted at the separated support points. In general terms, the first and second wheel receiving surfaces provide two separated main support points to the tread of the wheel when the fastening member retains the wheel of the bicycle to the body of the wheel holder. In both the above mentioned cases, the support points are distinct as they carry a high majority of the weight and force imparted to the wheel holder. The support points substantially carry the weight of the wheel and the bicycle.

The wheel holder provides stability and reduces wobbling particularly during transport. It can also reduce wear on the rim, the frame, the wheel holder itself, and thus also the bike carrier as a whole. It reduces risk that something breaks due to material fatigue, which could be disastrous should a bicycle or wheel accidentally fall off a bicycle carrier.

The void can be at least partly formed by the at least one body of the wheel holder, preferably by an aperture formed in one body or by a void formed between two separate bodies. If there are two separate bodies providing the first and the second wheel receiving surfaces, each body has a wheel receiving surface. The enable two distinct support points, a combination of raised ridges and an aperture is advantageous as such a wheel holder has been found to be easy to manufacture and require less material.

The wheel can be retained to the wheel holder in different manners. One advantageous configuration is if the at least one fastening member is adapted to extend substantially between the first and the second support points. In such case the fastening member can extend across the rim of the wheel diagonal with respect to the rotation plane of the wheel and the first plane. It is believed that this may assist in retaining the wheel in a preferred direction. It may also assist the positioning of the wheel holder with respect to a load carrier foot of a load carrying bar, or roof rack, when a bicycle carrier comprising at least one wheel holder is mounted to such load carrying bar. The fastening member can be tightened in different manners to the wheel holder using a fastening mechanism or simply by hooking it onto a portion of the wheel holder. The fastening member may be formed by a strap which can be elastic or substantially non elastic.

At least one of the first and second wheel receiving surfaces can be displaceably arranged to the body so that the distance between the first and second wheel receiving surfaces can be changed. If the first and/or the second wheel receiving surfaces are formed by ridges for example, the first and/or the second ridges can be slideably arranged on the body of the wheel holder to enable the displacement.

It has been found that a simple and sturdy construction is achieved is the body and the first and the second wheel receiving surfaces are integrally formed in one piece of material. One way of forming the body and the first and the second wheel receiving surfaces in one piece of material is by moulding the wheel holder using plastic material.

The first and second wheel receiving surfaces can be formed by a first and a second ridge portion. The first and/or the second ridge portion can comprise at least one an arc shaped ridge extending along the first plane. The wheel holder may thus comprise at least two separated arc shaped ridges separated in the first plane. The at least two separated arc shaped ridges separated in the first plane are preferably aligned with each other. The wheel holder preferably comprises at least two pair of aligned arc shaped ridges. The arc shaped ridges can preferably be separated a distance perpendicular to the first plane so that the wheel is not pinched between the two arc shaped ridges, but rather rests upon the arc shaped ridges.

The at least two pair of arc shaped ridges has two opposing sides facing towards each other and two opposing sides facing away from each other. The two opposing sides facing towards each other are substantially vertical and/or the two opposing sides facing away from each other are substantially angled with respect to a vertical axis. Having angled sides facing away from each other provides for rigid arc shaped ridges, or rigid ridges if the ridges have any other form. The rigidity of the ridges is advantageous if the wheel of the bicycle is being imparted with a force to turn e.g. via the wind resistance during transportation of the bicycle. It may also have the advantage that the raised portions have a tendency to cut into the wheel, rather than having the wheel flattened out onto the raised ridges.

The ridge portions may be hollow to save material in the manufacturing process.

The first and/or the second ridge portion can comprise at least two arc shaped ridges having different height, preferably different maximum height. Ridges of different heights enable wheel of different thickness, or different sizes to be safely secured to the wheel holder. The wheel holder can thus be configured to be compatible with wheels having a thickness of up to 30 cm, preferably from 1-10 cm. The height difference between two ridges, preferably arc shaped ridges, can be from 0.3-3.0 cm, preferably from 0.5-1.5 cm.

The wheel holder is preferably configured so that it can slide along the length of the bicycle carrier when mounted thereto. If the wheel holder in not positioned underneath the wheel of the bicycle directly, the wheel holder can be configured to be slip along the length of the bicycle carrier underneath the wheel. Such manoeuvre is simplified by having the wheel receiving surfaces formed by arc shaped ridges. The arc shaped ridges thus operates as wedges when slid underneath the wheel.

The distance between the arc shaped ridges in the first plane, is preferably selected to be such that when a wheel of the intended size rests on the arc shaped ridges, it is substantially only the facing sides of the opposing arc shaped ridges, with respect to the first plane, which provide to distinct support points to the wheel.

The height of at least one arc shaped ridge can be adjusted. This may enable more support points to the wheel. The wheel receiving surface can be formed by ridges for example, such ridge can be hinged in vertical tracks and be height adjusted by moving a wedge horizontally which pushes the ridge up and down in the track.

At least one of the first and the second ridge portions comprises two ridges. The two ridges are interspaced in a direction perpendicular to the first plane. Preferably a distance from the first plane of the wheel holder, the distance is preferably from 0.5-4.0 cm. Each of the first and the second ridge portions may comprise comprises two or more ridges, such as four ridges as described below. When having four ridges, the outer pair of ridges is preferably twice the distance from the first plane as the inner pair of ridges.

The wheel has a rim with a hub and a tyre. The hub and a first portion of the tyre, preferably the tread of the tyre, are positioned on either side of a line drawn between the first and second wheel receiving surfaces. The first and second wheel receiving surfaces can be made more or less prominent as support points by adjusting the height of the first and second wheel receiving surfaces. If the tread of the tyre is positioned on 1-40 cm from the line drawn between the first and second wheel receiving surfaces, the first and second wheel receiving surfaces are providing for good support points to the wheel.

The first portion of the tyre comprises a point on the tyre which intersects with a vertical axis, the vertical axis extends through the hub of the wheel. The point on the tire is preferably the lowest point on the tyre.

The first and the second wheel receiving surfaces can be arranged to the body so that they have substantially the same height. For example, if the first and the second wheel receiving surfaces each has an apex, they can be arranged so that if a line is drawn between the apex of the first wheel receiving surface and the apex of the second wheel receiving surface, the line is substantially horizontal.

The distance between the first and the second wheel receiving surfaces can be selected to be from 5-30 cm, preferably 10-20 cm. This applies of course also if the wheel receiving surface is a ridge portion or an arc shaped ridge, or if the first and the second wheel receiving surfaces has any other form.

If the first and the second wheel receiving surfaces are formed by arc shaped ridges, such arc shaped ridges preferably has a radius arc having a radii from 10-50 mm, preferably from 15-40 mm. The angle between the two radii defining the arc length of the radius arc shaped ridges can be from 40-120 degrees for example.

According to a second aspect, the wheel holder is for a bicycle carrier for a vehicle is configured to receive and retain a wheel having a rim. The wheel holder comprises at least one body. A first plane aligned with a rotation plane of the wheel of the bicycle after the wheel has been mounted to the wheel holder. At least one fastening member is adapted to retain the wheel of the bicycle to the first and the second wheel receiving surfaces of the body. The fastening member has a released position in which the wheel can be positioned in the wheel holder and a secured position in which the wheel holder is retaining the wheel.

The at least one fastening member is adapted to extend in a diagonal direction across the first plane and the rim of the wheel when being positioned in the secured position.

By having the fastening member extending in a diagonal direction across the rim of the wheel holder and the first plane of the wheel holder, the wheel can efficiently be secured to the wheel holder. The diagonal fastening member, e.g. a diagonal strap, further imparts the wheel with a force acting to turn the wheel. It is believed without being bound by theory that the force acting to turn the wheel improves the retaining properties of the wheel holder as the wheel will be "pinched" by the wheel holder.

The wheel holder has a first and a second side, each side having a first and a second end. The fastening member may extend substantially from the first end of the first side to substantially the second end of the second side. The first and second sides are preferably longitudinal sides. In this manner, the full length of the wheel holder can be used. This will also provide the fastening member with a low angle with respect to the first plane of the wheel holder.

The wheel holder may be formed by a single body. The first and the second sides can thus be arranged on the one single body. In cases were the body of the wheel holder is formed by two individual and separate bodies, the first side of one body is the opposing to the second side of the second body, with respect to the first plane of the wheel.

The body of the wheel holder may have at least one, preferably a first and a second protruding support portion. The at least one or the first and the second protruding support portions are adapted to counteract a force acting to impart a turning motion of the wheel due to the fastening member when the wheel is retained to the wheel holder. The wheel holder improves its "pinching" properties.

The first protruding support portion may be arranged opposite of the first end of the first side, and the second protruding support portion may be arranged opposite of the second end of the second side.

The fastening member may be provided with a protective cover. The protective cover may be adapted to extend across the rim of the wheel when the wheel is retained to the wheel holder. The protective cover is arranged to provide a more lenient surface towards the rim of the wheel.

The fastening member may be at least partly formed by thermoplastic material such as polypropylene, acrylonitrile butadiene styrene (ABS), polyurethane, or combinations thereof. Preferably the fastening member and/or the body is at least partly formed by thermoplastic polyurethane such as poly(adipate)ester based thermoplastic polyurethane, such as ISOTHANE 1055D. The fastening member can be injection molded, blow molded or extruded.

The present invention also relates to a bicycle carrier comprising at least at least one wheel holder, or two or more wheel holders, disclosed herein. The at least one wheel holder can be slideably arranged to the bicycle carrier.

BRIEF DESCRIPTION OF THE DRAWINGS

Non-limiting embodiments of the present invention will be described in greater detail with reference to the accompanying drawings in which.

DETAILED DESCRIPTION

Figure 1:
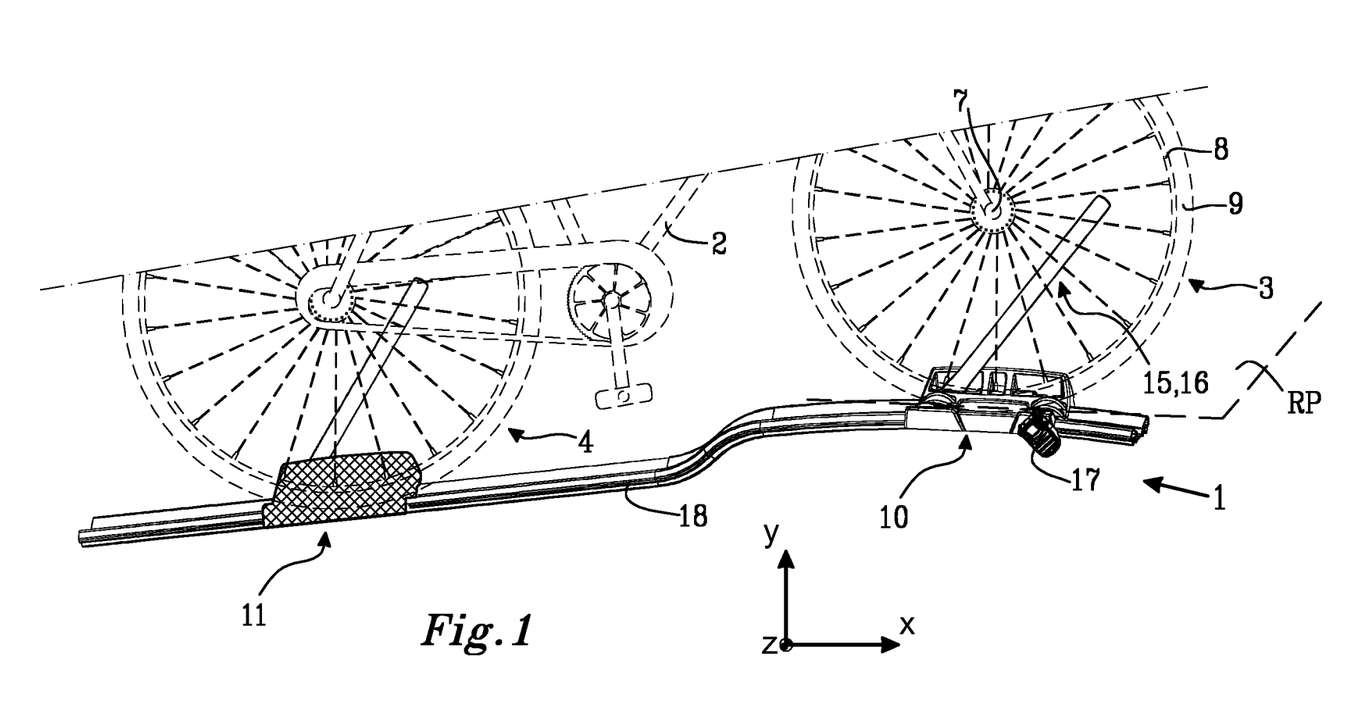
FIG. 1 shows a bicycle carrier comprising two wheel holders and a bicycle mounted thereto.

FIG. 1 shows a bicycle carrier 1 for transporting a bicycle 2 on a vehicle (not shown) such as a car. The bicycle 2, which is only schematically illustrated, has a first and a second wheel 3, 4, which in FIG. 1 rest on the bicycle carrier 1, so that the bicycle 2 is positioned in a transport position after being retained to the bicycle carrier 1. In the transport position, the bicycle 2 can be transported on the bicycle carrier 1 using the vehicle. Each wheel comprises a rim 8 with a hub 7 and a tyre 9. The bicycle carrier has a wheel holder 10, adapted to hold and retain the wheel. It should be noted that the bicycle carrier 1 can have one or more of the wheel holder 10 described herein. The bicycle carrier could also be provided with a support arm adapted to hold the bicycle to the bicycle carrier 1. Such support arms can be provided with a clamping jaw adapted be attached to the frame of the bicycle for example.

A wheel holder will be described in greater detail below. Although only one wheel holder is described in greater detail, it should be noted that the bicycle carrier can be provided with one or more wheel holders described herein.

The wheel 3 of the bicycle is retained to the wheel holder 10 using a fastening member 15, in this case formed by a strap 16 and a strap lock 17. The bicycle carrier comprises a bar 18 to which the wheel holder 10 is slideably attached to enable adjustment to bicycle of different sizes. In FIG. 1, the wheel holder 10 can be referred to as a front wheel holder, and a second wheel holder 11 can be referred to as a rear wheel holder. This enables bicycles of different sizes to be transported. As mentioned one or more additional support arms (not shown) can be used to further attach the bicycle 2 to the bicycle carrier 1.

For the purpose of orientation, the length of the bicycle carrier extends along the X axis, the height along the Y axis and a width along the Z axis, as shown in FIG. 1. Likewise, the length of the wheel holder extends along the X axis, the height along the Y axis and the width along the Z axis, as shown in FIG. 1. Each wheel has a rotation plane RP, parallel with the Y-X plane, in which the wheel would rotate about its rotation axis.

The bar 18 of the bicycle carrier 1 is, in the shown embodiment, manufactured from extruded aluminum having a substantially U-shaped cross section, or V-shaped cross section, adapted to receive parts the wheels 3, 4 of the bicycle 2. The substantially U-shaped cross section is formed by a groove which also is adapted to cooperate with the wheel holder 10 to partly retain the wheel holder 10 to the bicycle carrier 1 and to permit the wheel holder 10 to slide along the length of the bicycle carrier 1, i.e. along the X axis. The wheel holder 10 can be displaced, in this case slide, along the length of the bicycle carrier 1 and more precisely the bar 18 of the bicycle carrier 1, and thus be positioned substantially at an infinite number of different positions. In comparison, bicycle carriers having predetermined positions for wheel holders only permits a limited number of positions for the wheel holders, and thus also a limited number of different sizes of bicycles which can be transported.

Figure 2:
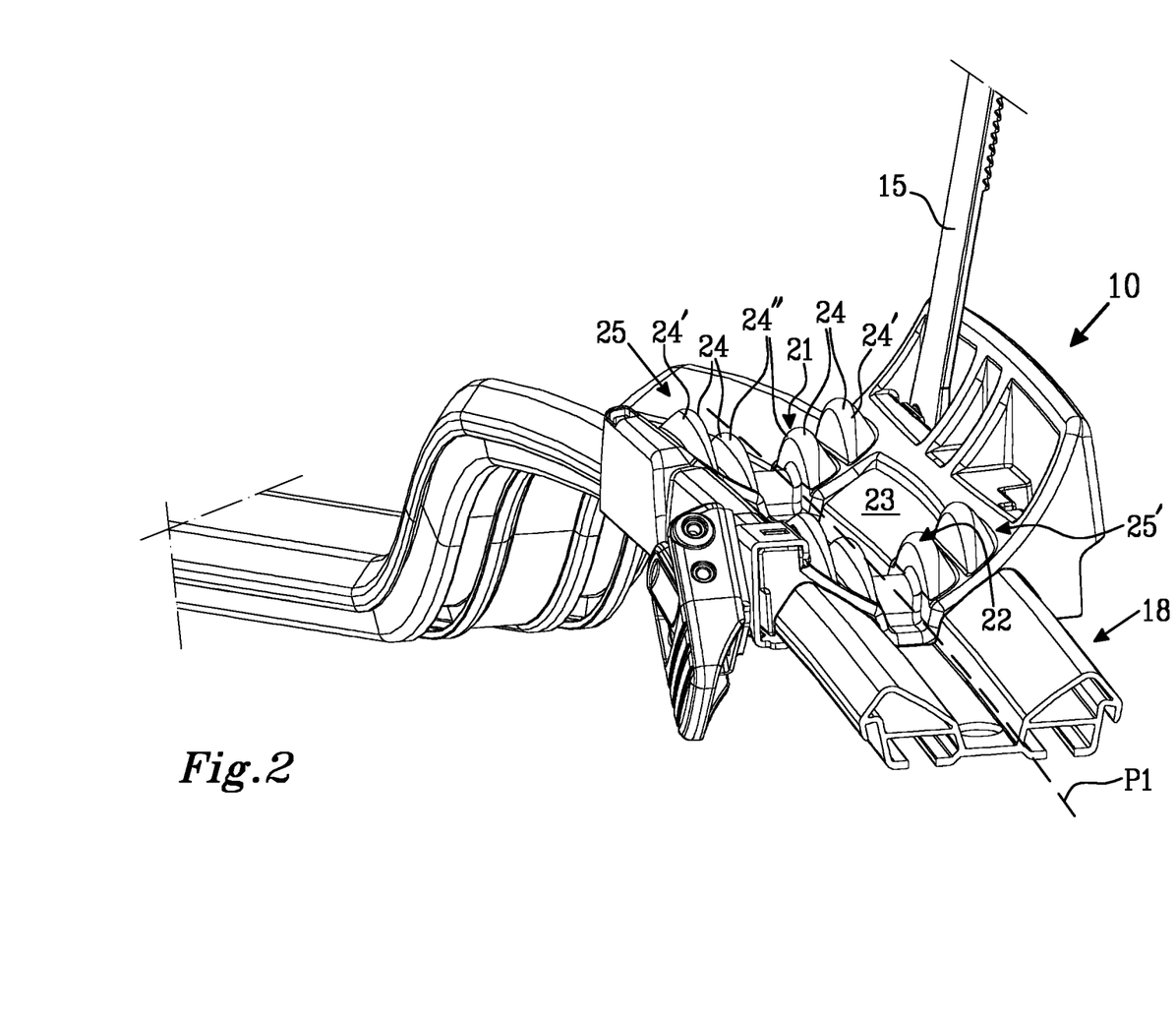
FIG. 2 shows a wheel holder and a portion of the bar of the bicycle carrier in greater detail.

FIG. 2 shows the wheel holder 10 and the bar 18 of the bicycle carrier 1 in greater detail. The wheel holder 10 comprises a body 20 formed by a thermoplastic material such as polypropylene, acrylonitrile butadiene styrene (ABS), polyurethane, or the like. The wheel holder 10 is adapted to be positioned on the bar 18 of the bicycle carrier 1 and hence the shape and the form of the bar facing side of the wheel holder corresponds to the shape and form of the bar 18 of the bicycle carrier 1 so that the wheel holder 10 can mate with the bar 18.

The wheel holder 10 comprises a first and a second wheel receiving surface 21, 22. Each of the wheel receiving surfaces 21, 22 is formed by a plurality of raised ridges 24 extending along the length of the wheel holder 10, i.e. the X axis. A void 23 is formed between the first and the second wheel receiving surface 21, 22, and is adapted to receive a portion of the wheel (not shown). The first and the second wheel receiving surfaces 21, 22 are formed in one unitary piece of material with the body 20 but could be formed by separate components. In FIG. 2, each wheel receiving surface 21, 22 comprises two pairs of parallel raised ridges 24', 24". Each pair is intended to cooperate with a wheel having a predetermined size and width, enabling the wheel holder 10 to be compatible with wheels of different sizes. The wheel holder 10 is intended to receive the wheel along a first plane P1, which is equivalent with the rotation plane of the wheel.

The void 23 separates the first and the second wheel receiving surfaces 21, 22, in this case the ridges 24 of the first and the second wheel receiving surfaces 21, 22. The void 23 receives a portion of the wheel when the wheel is retained to the wheel holder 10. As a portion of the wheel is received in the void 23, the first and the second wheel receiving surfaces 21, 22 will form separated support points 25, 25° for the wheel with respect to the first plane P1 and the void 23. The purpose and function of this will be described in greater detail below. The ridges 24 have an arc shaped form, or a convex form, which are parallel with respect to each other and with respect to the first plane P1 and thus the rotation plane of the wheel after the wheel has been mounted to the wheel holder 10.

As mentioned, the fastening member 15, shown in FIGS. 1 and 2, is arranged to the body 20 and adapted to extend cross the rim of the wheel to retain the wheel to the wheel holder 10. As is noticeable in FIGS. 2, 3, and 6, the at least one an arc shaped ridge 24 is substantially symmetrically arc shaped but could be partly arc shaped if desirable.

Figure 3:
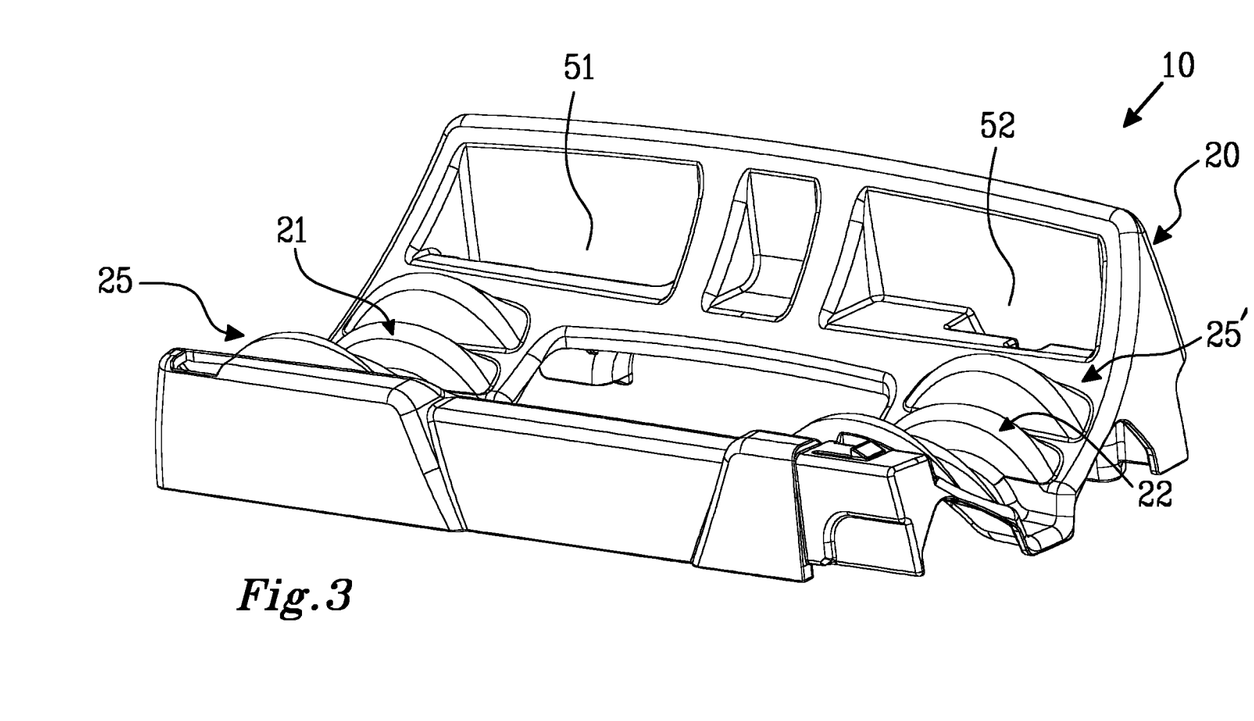
FIG. 3 shows the wheel holder of FIG. 2 in greater detail with a view in perspective.

FIG. 3 shows the wheel holder 10 in greater detail. The body 20 comprises a first and a second aperture 51, 52. The apertures 51, 52 can be used to attach the fastening member 15 (not shown in FIG. 3) to the body 20 of the wheel holder 10 in two different positions dependent if the present wheel holder 10 is a front or a rear wheel holder. It should be noted that the fastening member can be attached to the wheel holder in any other suitable manner.

The shape and form of the first and the second wheel receiving surface 21, 22 may vary. The important aspect is however that the first and the second wheel receiving surfaces 21, 22 provide the wheel with two distinct support points 25, 25' when the wheel has been retained to the wheel holder. The distinct support points may be separated as shown in FIG. 3, or be main support points, i.e. receiving a high majority of the load imparted by the wheel. The two support points should be separated by a void which permits a portion of the wheel to be received therein. The force imparted by the fastening member acting on the portion of the wheel which has been received in the void of the wheel member, should be significantly less than the force imparted by the fastening member acting at the support points, i.e. at the first and the second wheel receiving surfaces. Preferably, the wheel, or more precisely the tyre of the wheel, is not imparted with any force component at all at the portion which has been received in the void of the wheel holder.

Figure 4:
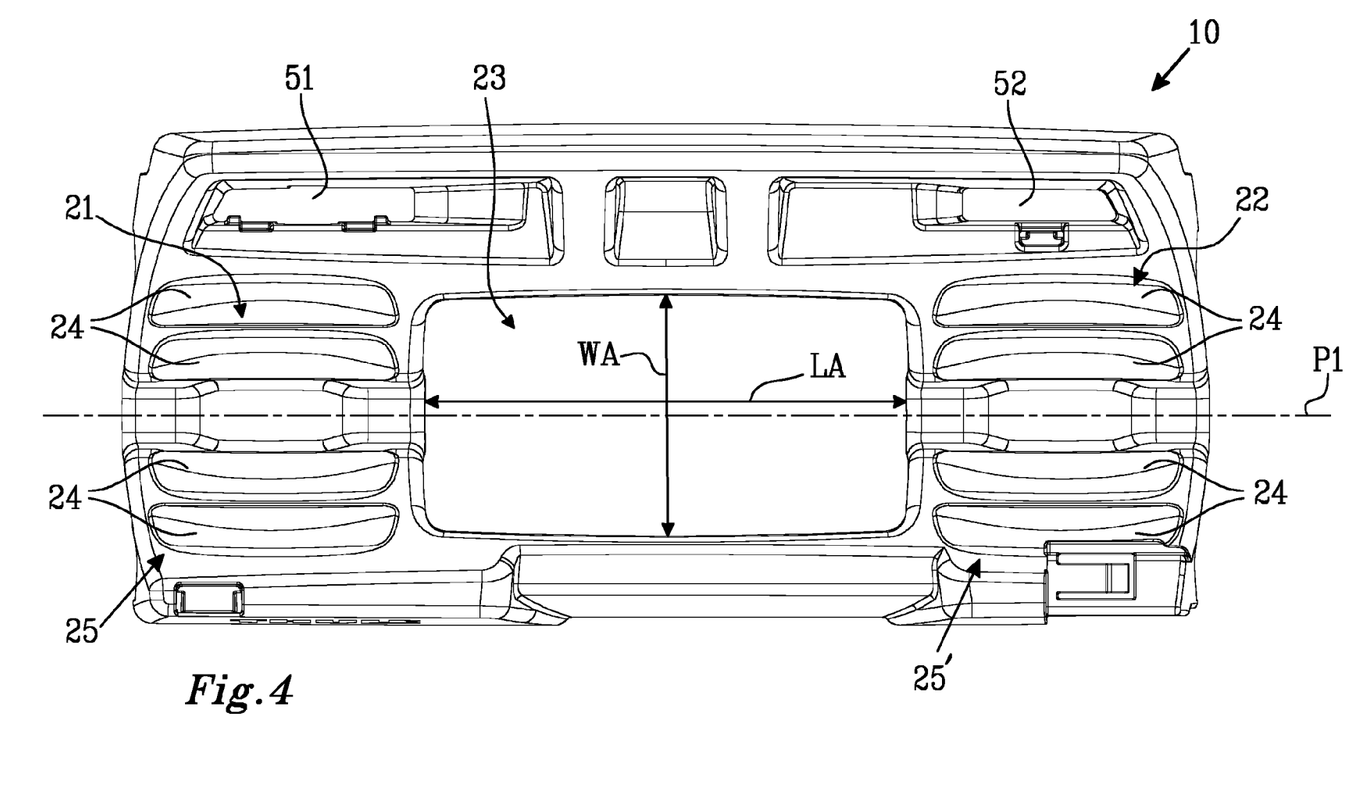
FIG. 4 shows the wheel holder of FIG. 3 as seen from above.

FIG. 4 shows the wheel holder 10 of FIG. 3 from above. The first plane P1, equivalent with the rotation plane of the wheel when mounted to the wheel holder 10, is indicated in FIG. 4 with dashed lines. The first and the second wheel receiving surfaces 21, 22 will provide the wheel with first and a second support point 25, 25' onto which the wheel is pressed as the fastening member (not shown) is tightened. As the void 23 is arranged between the support points 25, 25', and thus separates the support points 25, 25', the wheel will be held towards the wheel holder 10 in a very tight and stable manner. The void 23 is partly formed, or defined, by the first and the second wheel receiving surfaces 21, 22, which are formed by the plurality of raised ridges 24. The plurality of raised ridges 24 extends along the length of the wheel holder 10, i.e. along the first plane P1. Hence, the first and the second wheel receiving surfaces 21, 22 provide the wheel with first and a second support point 25, 25' which are separated at least with respect to the length of the wheel holder 10. The void 23 is also partly formed by an aperture 30 between the first and the second wheel receiving surfaces 21, 22. The aperture 30 intersects with the first plane P1 of the wheel holder 10 and provides additional space for the tyre 9 when the wheel 3 has been mounted to the wheel holder 10. It should be noted that instead of having an aperture, a recess can provide additional space for the tyre 9 when the wheel 3 has been mounted to the wheel holder 10. In general terms, the void 23 can be formed by raised portions of the body, such as raised ridges 24 and/or by an aperture or recess in the body 20. Further shown in FIG. 4 are the apertures 51, 52 which can be used to attach a fastening member to the body 20 of the wheel holder 10.

The aperture 30 of the body has a length LA and a width WA. The length LA can be from 4-25 cm, preferably 5-15 cm. The width WA can be from 2-12 cm, preferably 3-8 cm.

Figure 5:
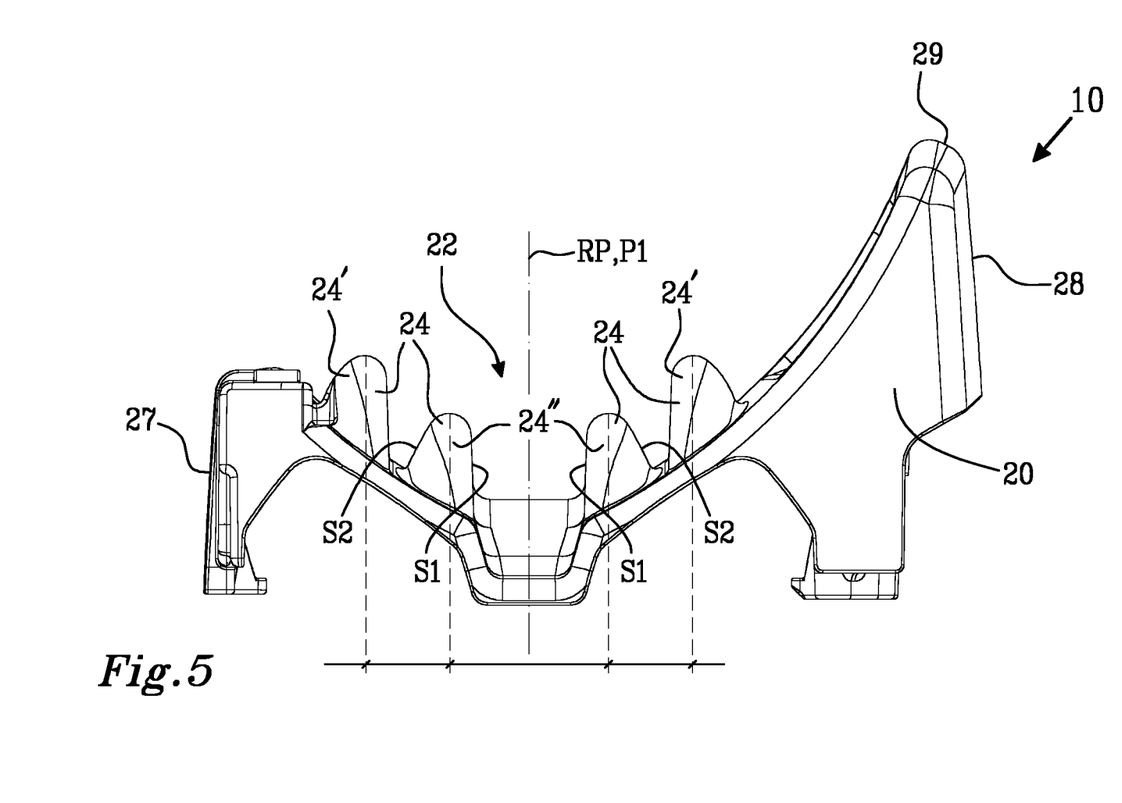
FIG. 5 shows the wheel holder of FIG. 3 as seen from the side, corresponding with a view along the bar of the bicycle carrier.

FIG. 5 shows the wheel holder 10 from with a view along the first plane P1. FIG. 5 shows the body 20. FIG. 5 shows the ridges 24 of the second wheel receiving surface 22. As is noticed, the body 20 of the wheel holder 10 comprises a first and a second side 27, 28, in this case a left and a right side when view as shown in FIG. 5. The second side 28, i.e. the right side, has a protruding wall section 29 which protrudes past the level of the highest ridge 24 along the height of the wheel holder. The protruding wall section can be adapted to provide rigidity to the wheel if desirable but it is not necessary. It further provides the fastening member with a strong connection provided material for the apertures 51, 52 (shown in FIGS. 3 and 4) which can be used to attach a fastening member to the body 20 of the wheel holder 10. The two pairs of parallel raised ridges 24', 24" has different height and being positioned a distance from the center of the wheel holder 10. Each pair is intended to cooperate with a wheel having a predetermined size and width, enabling the wheel holder 10 to be compatible with wheels of different sizes.

The ridges 24 are separated a distance from the first plane P1 as indicated in FIG. 5. The distance to the first plane P1, and thus between the ridges themselves, may vary dependent on which size of the wheel the wheel holder in intended to be used with. A suitable distance to the first plane P1 is from 0.5-4.0 cm. When viewed as shown in FIG. 5, the first plane P1 extends in the center of the lowest part of the U-formed wheel holder. The inner pair of ridges 24 may be positioned a distance of 0.5 cm from the first plane P1 while the outer pair is positioned a distance of 1.0 cm from the first plane P1. The distance is measured as shown in FIG. 5, i.e. from the apex of the ridge and to the center of where the rotation plane RP will be positioned. Each of the first and the second ridge portions may comprise comprises two or more ridges, such as four ridges as shown in FIGS. 2-5. When having four ridges, the outer pair of ridges is preferably twice the distance from the first plane as the inner pair of ridges.

As is further noticeable, the pair of arc shaped ridges 24', 24" has two opposing sides S1 facing towards each other and two opposing sides S2 facing away from each other. The two opposing sides S1 facing towards each other are substantially vertical in FIG. 5 substantially parallel with the first plane P1, while the two opposing sides S2 facing away from each other are substantially angled with respect to a vertical axis in FIG. 5 parallel with the first plane P1. The angle between the two sides S1, S2 of the arc shaped ridges 24', 24" are when viewed as illustrated in FIG. 5 from 15-80 degrees.

Figure 6:
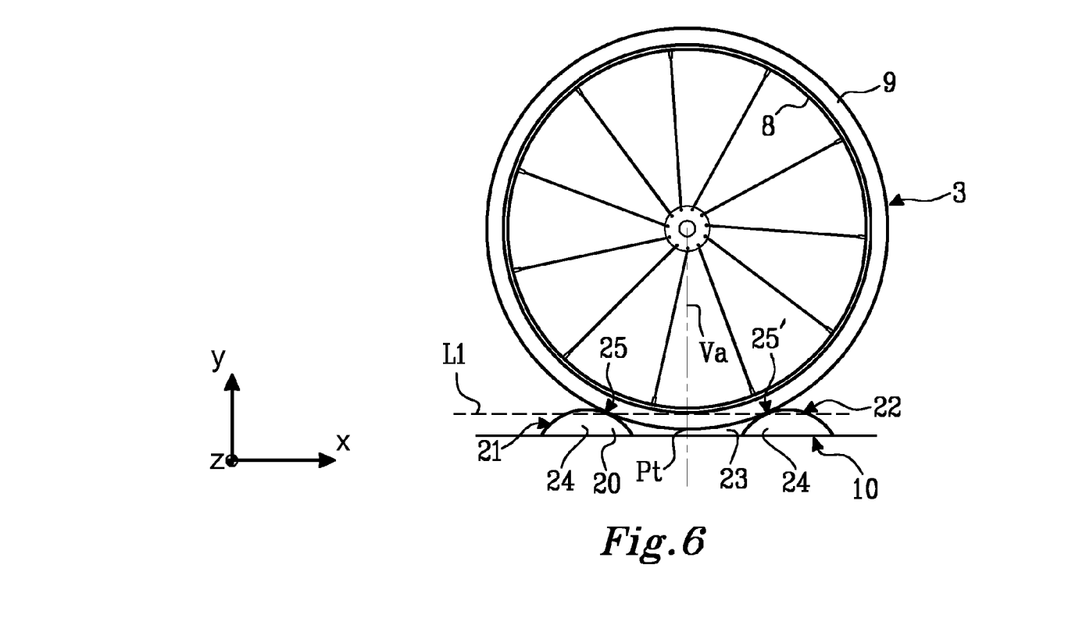
FIG. 6 shows an illustration of the function of the wheel holder.

FIG. 6 illustrates the function of the wheel holder 10. FIG. 6 shows the portions of the wheel holder 10 and the wheel 3. The ridges 24 provide with two separated support points 25, 25', separated by the void 23. The support points 25, 25' are the points at which the wheel holder is imparting the wheel with the main force to retain the wheel to the wheel holder along the Y axis. The support points 25, 25' mainly contacts the tyre 9 on the tread of the tyre 9 but preferably slightly offset to the center of the tread of the tyre 9. It is possible that a wheel holder may have side portions which are intended to stabilize the wheel in direction of the Z axis. One or more support arms (not shown) may be used for this purpose additionally or optionally. A dashed line L1 is drawn in FIG. 6 between the apexes of the ridges 24. The dashed line L1 is referred to as an imaginary line between the ridges 24, or between the apexes of the ridges 24, i.e. between the first and the second wheel receiving surfaces 21, 22. As is noticeable, a portion of the tyre 9, and especially the periphery of the tyre 9 is arranged between the ridges 24 and on opposite side of the dashed line L1 with respect to the hub 7 of the wheel 3. Further noticeable in FIG. 6 is that the periphery of the tyre 9 is not contacting the bottom in the void 23. The bottom of the void 23 can be formed by the bar 18 (not shown) of the bicycle carrier 1 or by a portion of the body 20 itself. The surface beneath the void 23 could be a portion of the body 20 and/or the bar 18 of the bicycle carrier 1. When referring to the wheel holder 10 shown in FIG. 6, the surface beneath the void 23 is the bar 18, as the wheel holder 10 has an aperture between the first and the second wheel receiving surfaces 21, 22.

The wheel holder 10 is positioned in FIG. 6 so a first portion of the tyre 9 has a point Pt on the tyre 9 which intersect with a vertical axis, in FIG. 6 denoted Va, the vertical axis Va extends through the hub 7 of said wheel 3. The vertical axis Va is parallel with the Y axis. The point Pt is the lowest point on the tyre 9 when positioned as shown in FIG. 6. In a general aspect, the first and the second wheel receiving surfaces 21, 22 and the void 23, is positioned so that the lowest point of the tyre 9 of the wheel is positioned in the void 23 of the wheel holder 10.

The first and the second wheel receiving surfaces can be arranged to the body so that they have substantially the same height as can be seen in FIG. 6 for example. In FIG. 6, the first and the second wheel receiving surfaces 21, 22 each has an apex and are arranged so that the line drawn between the apex of the first wheel receiving surface 21 and the apex of the second wheel receiving surface 22 is substantially horizontal. This provides for an even force distribution between the first and the second wheel receiving surfaces 21, 22 which is advantageous.

Figure 7A:
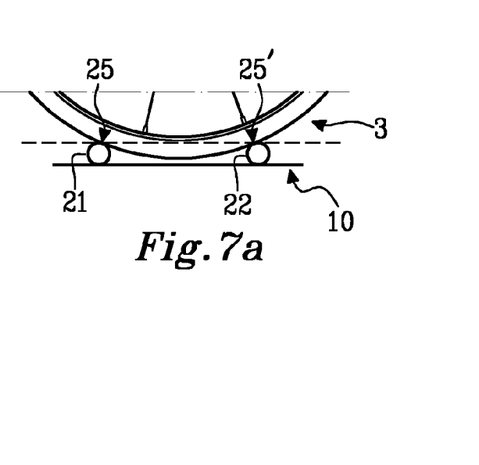
FIGS. 7a-7b show alternative forms of the wheel receiving surfaces.
Figure 7B:
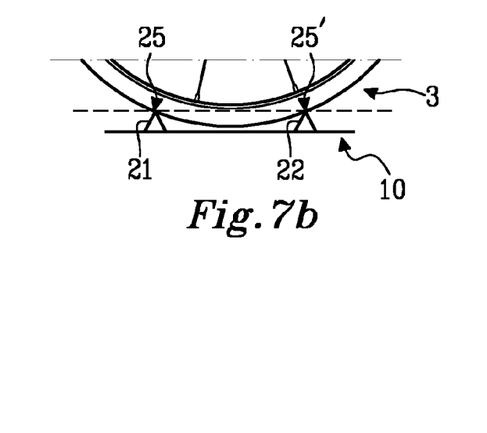

FIGS. 7a-7b show alternative shapes and forms of the wheel receiving surfaces 21, 22 of the wheel holder 10. Only portions of the wheel 3 have been illustrated. As is noticeable, the wheel receiving surfaces can have different shapes and forms, as long as they provide for a first and a second distinct support point 25, 25'. In FIG. 7a the wheel receiving surfaces have a circular form and in FIG. 7b, the wheel receiving surfaces have a triangular form. Combinations of the shapes and forms described above, including the arc shaped form, are of course possible.

The invention claimed is:

1. A wheel holder for a bicycle carrier for a vehicle, said wheel holder configured to receive and retain a bicycle wheel having a rim, said wheel holder comprising:

at least one body having at least one wheel receiving surface;

a first plane aligned with a rotation plane of said bicycle wheel after said bicycle wheel has been mounted to said wheel holder; and at least one fastening member configured to retain said bicycle wheel to said at least one wheel receiving surface of said body, said fastening member having a released position in which said bicycle wheel can be positioned in said wheel holder and a secured position in which said wheel holder retains said bicycle wheel, wherein said at least one fastening member is configured to extend in a diagonal direction across said first plane and said rim of said bicycle wheel when positioned in said secured position.

2. The wheel holder according to claim 1, wherein said wheel holder comprises a first side and a second side, each side having a first end and a second end, wherein said fastening member extends from said first end of said first side to said second end of said second side, wherein said first and second sides are longitudinal sides.

3. The wheel holder according to claim 2, wherein said wheel holder is formed by a single body, wherein said first and second sides are arranged on said single body.

4. The wheel holder according to claim 2, wherein said body of said wheel holder has at least one protruding support portion, said at least one protruding support portion configured to counteract a force acting to impart a turning motion of said bicycle wheel due to said fastening member when said bicycle wheel is retained to said wheel holder.

5. The wheel holder according to claim 4, wherein a first protruding support portion is arranged opposite of said first end of said first side, and wherein a second protruding support portion is arranged opposite of said second end of said second side.

6. The wheel holder according to claim 2, wherein said first end is a terminal end of said first side and said second end is a terminal end of said second side.

7. The wheel holder according to claim 1, wherein said fastening member is at least partly formed by a thermoplastic material.

8. The wheel holder according to claim 7, wherein said thermoplastic material is polypropylene, acrylonitrile butadiene styrene (ABS), polyurethane, or combinations thereof.

9. The wheel holder according to claim 1, wherein said body has a first wheel receiving surface and a second wheel receiving surface.

10. The wheel holder according to claim 1, wherein said fastening member comprises a strap and a strap lock.

11. The wheel holder according to claim 10, wherein said wheel holder comprises a first side and a second side, each side having a first end and a second end, wherein said strap is attached to said wheel holder at said first end of said first side, and wherein said strap lock is attached to said wheel holder at said second end of said second side.

12. A bicycle carrier for a vehicle, comprising:

an elongate bar;

a wheel holder coupled to the elongate bar and configured to receive and retain a bicycle wheel, the wheel holder comprising:

a body having a wheel receiving surface;

a first plane aligned with a rotation plane of the bicycle wheel when the bicycle wheel is received on the wheel holder; and a fastening member configured to retain the bicycle wheel to the wheel receiving surface of the body, the fastening member having a released position in which the bicycle wheel can be positioned in the wheel holder and a secured position in which the fastening member retains the bicycle wheel to the wheel holder, wherein the fastening member extends in a diagonal direction across the first plane and the bicycle wheel when positioned in the secured position.

13. The bicycle carrier according to claim 12, wherein the fastening member comprises:

a strap having a first end and a second end; and a strap lock, wherein the first end of the strap is attached to a first side of the body of the wheel holder and the strap lock is attached to a second side of the body of the wheel holder.

14. The bicycle carrier according to claim 12, wherein said wheel holder comprises a first side and a second side, each side having a first end and a second end, wherein said fastening member extends from said first end of said first side to said second end of said second side.

15. The bicycle carrier according to claim 14, wherein said first end is a terminal end of said first side and said second end is a terminal end of said second side.

* * * * *